United States Patent [19]
Paul et al.

[11] Patent Number: 4,841,928
[45] Date of Patent: Jun. 27, 1989

[54] RECIPROCAL ENGINE WITH FLOATING LINER

[76] Inventors: Marius A. Paul; Ana Paul, both of 969 La Paz Rd., Placentia, Calif. 92670

[21] Appl. No.: 132,018
[22] Filed: Dec. 14, 1987
[51] Int. Cl.$^4$ .............................. F02B 77/00
[52] U.S. Cl. ........................ 123/193 CP; 123/668
[58] Field of Search ............ 123/193 CP, 668, 669, 123/671, 294, 298, 252, 255, 272, 670, 58 R

[56] References Cited

U.S. PATENT DOCUMENTS

| | | | |
|---|---|---|---|
| 841,830 | 1/1907 | Wackenhuth | 123/669 |
| 3,969,894 | 7/1976 | Bachmann | 123/193 CP |
| 4,182,283 | 1/1980 | Czuba | 123/193 CP |
| 4,185,593 | 1/1980 | McClure | 123/670 |

FOREIGN PATENT DOCUMENTS 3622301 1/1988 Fed. Rep. of Germany ...... 123/668

*Primary Examiner*—David A. Okonsky
*Attorney, Agent, or Firm*—Bielen and Peterson

[57] ABSTRACT

A two-cycle, internal combustion engine designed for operation in conjunction with high pressure supercharging for high temperature, high pressure combustion in one or more piston cylinders, the combustion chamber including a porous, floating liner displaced from the cylinder walls of the combustion chamber, the pistons having a concentric groove for receiving the floating liner on the compression stroke for insulating the wall of the piston cylinder from the hot gases of combustion.

22 Claims, 3 Drawing Sheets

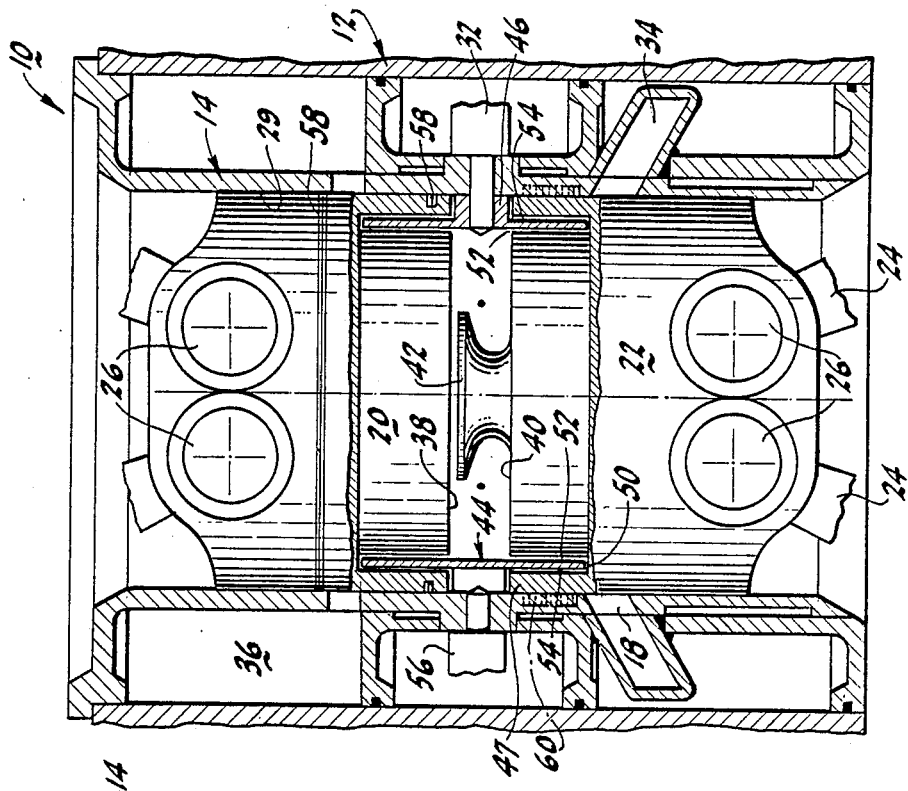

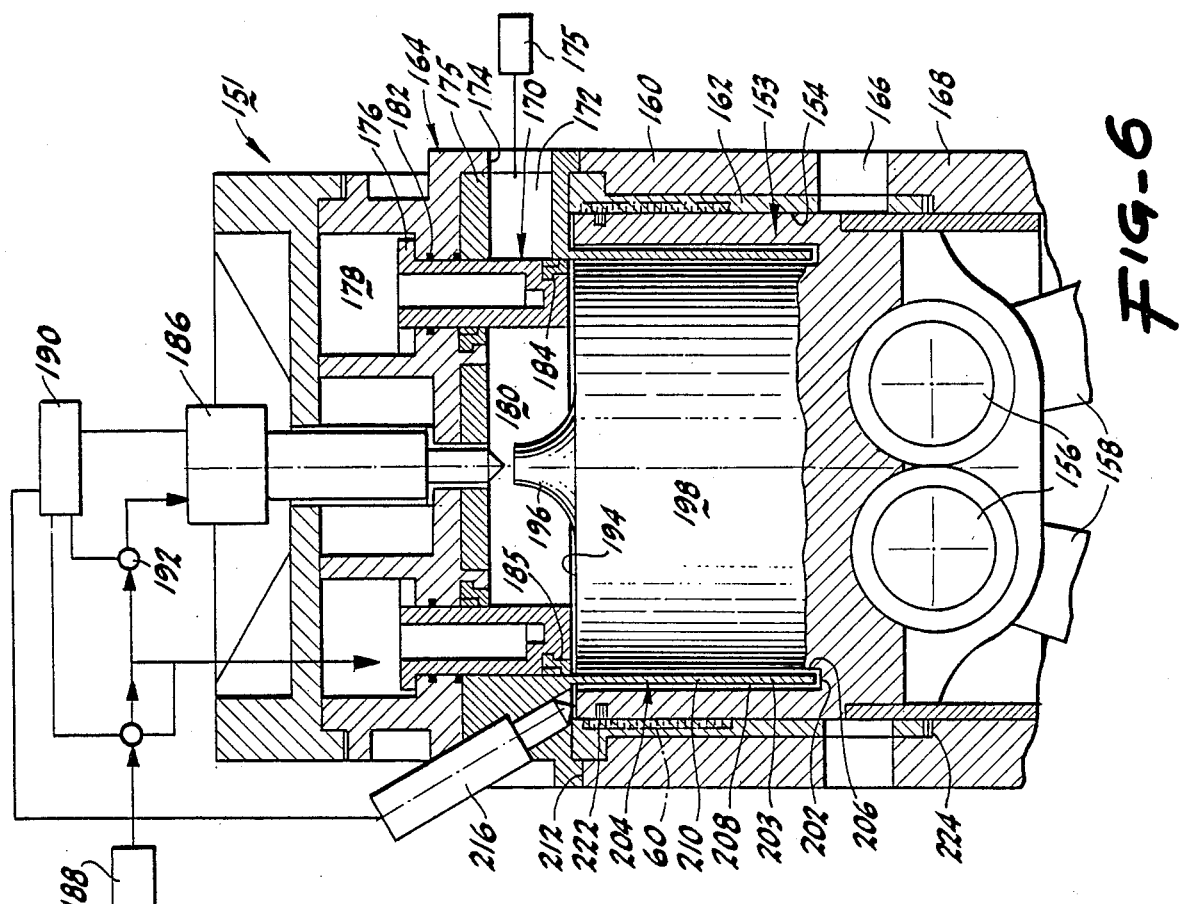
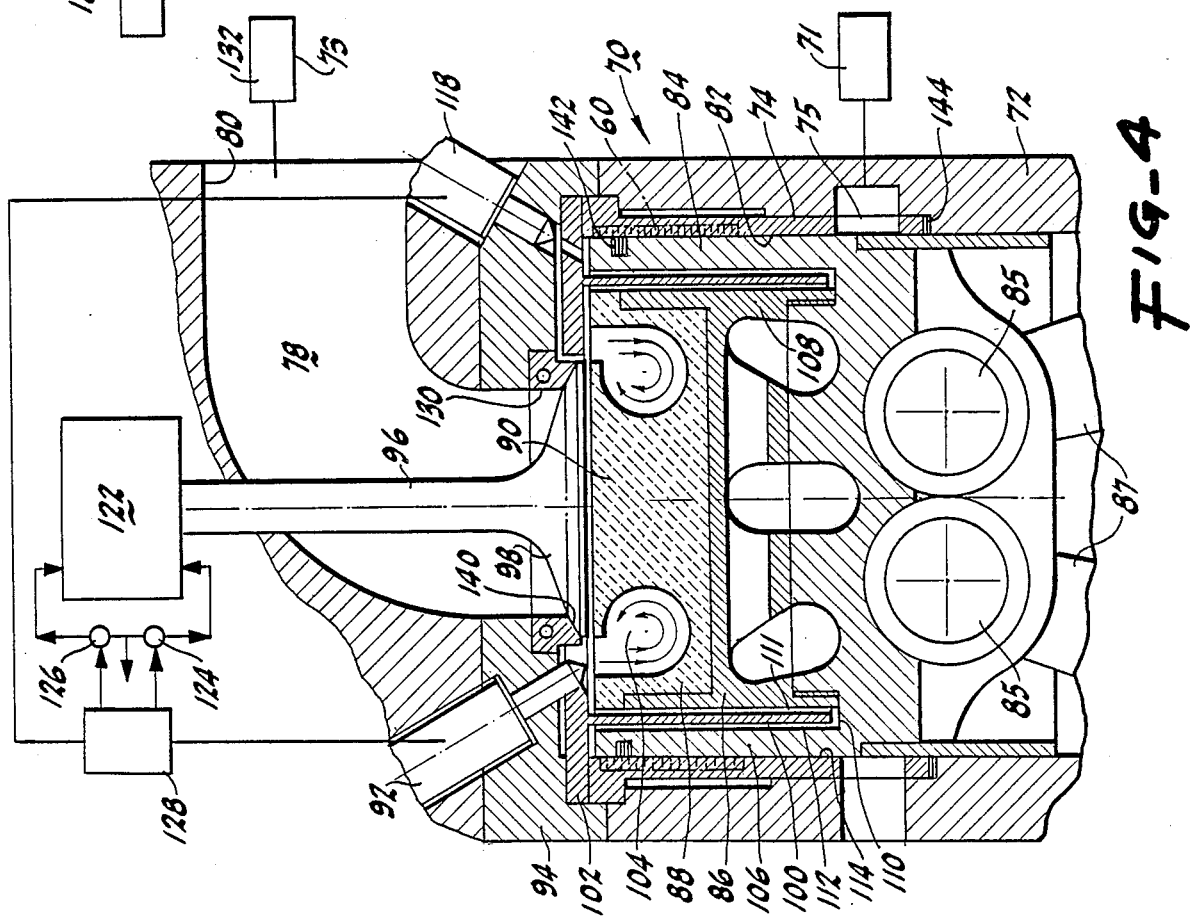

RECIPROCAL ENGINE WITH FLOATING LINER

BACKGROUND OF THE INVENTION

In the state of the art for engine design it is a desirable objective to design an adiabatic engine in which all of the thermal energy developed by the combusted fuel is utilitzed and recovered as useful work. While thermal losses are inevitable, by maximazing the recoverable energy thermal efficiencies approximating 85% can be achieved. However, in order to achieve such efficiencies extraordinarily high temperatures and pressures must be developed. By using appropriate supercharging means, such as the positive displacement devices described in U.S. Pat. No. 4,791,787, issued Dec. 20, 1988 and filed Dec. 5, 1985, entitled Regenerative Thermal Engine engine pressures approaching 300 bars and temperatures of approximately 2,400 degrees Farenheit can be obtained. Designing combustion chambers and reciprocator components to withstand such temperatures and pressures becomes a formidable task, particularly where thermal energy is desired to be converted into useful work and not dissipated by bulky and wasteful cooling systems. Where the engines are designed for military use, the waste heat dissipated by cooling systems or direct exhaust results in a high infrared signature which is readily detectable.

The principle problem confronting engine designers, therefore, is to devise a high temperature and pressure engine that develops a high power density wherein the engine is adapted to use a high supercharging level without the penalty of low compression ratio which is a main factor in reducing efficiency.

While various advances in achieving the objective of an adiabatic engine have been made utilizing ceramics, many unsolved problems arise with the adaptation of ceramics, which have desirably high heat resistant characteristics, to reciprocal engines that require high strength in its stationary and dynamic components as well. In addition to strength, the other common problem in utilizing ceramics is the dissimilarity in the expansion coefficient of ceramic components in comparison with conventional metallic components with which they must be associated.

This invention is directed at solving many of the problems in adapting ceramic components to a high pressure, high temperature reciprocal engine that includes various heat recovery subsystems for producing a compact high power density engine having a minimal heat dissipation. The engine is particularly suitable for military applications where it is desirable to have a small power package located under armoured protection with minimal detection heat radiation. In this manner the payload, weaponry, fire capacity, fuel, electronics or other components of the vehicle can be enhanced with the reduction in size and weight of the power plant.

SUMMARY OF THE INVENTION

This invention relates to an internal combustion engine designed for high temperature and pressure operation with minimal thermal loss. To achieve this design a novel, heat-resistant, porous, floating liner has been devised to divide the combustion chamber of the reciprocal engine into multiple concentric thermal zones to contain the highest temperatures in a central zone of the cylinder.

The floating liner is displaced from the walls of the cylinder chamber by integral spacers. The floating liner is constructed preferably of a refractory material and is porous both to allow air absorption into the material for cooling and to permit equalization of any pressure differentials across the liner that occur during the combustion process. The degree of porosity is therefore dependent in part on the strength of the material with greater porosity being required for materials that are of lower structural strength. Approximately 5-10% of the liner may be occupied by compressed air. In embodiments of this invention where the engine includes opposed pistons, a single floating liner is supported around a central band that provides two tubular end sections for engagement by the opposed pistons. In the various engine embodiments described in this invention the floating liner is used in combination with select systems to minimize thermal losses by passive insulating and active heat recovery systems that in certain preferred embodiments include steam cogeneration systems.

The suspended liner is arranged proximate the cylinder walls but displaced therefrom to allow an outer concentric sleeve portion of the piston head to reciprocate between the liner and the wall of the cylinder with an air space between the liner and sleeve. The piston head includes a central solid cylinder portion with a periphery displaced from the outer annular sleeve portion such that the central portion and sleeve portion form a deep groove in the head of the piston. It is in this groove that the liner is engaged on displacement of the piston during the compression stroke. In a similar manner the liner is displaced from the central portion such that an air space is provided between the liner and the central portion and the liner and the sleeve portion. These two concentric air spaces provide an insulation between the inner high temperature working space of the combustion chamber and the outer low temperature space with the air impregnated liner itself providing a third zone of insulation.

The floating liner and piston arrangement in combination with the heat recovery systems in the cylinder form a highly efficient combustion chamber for high temperature high pressure combustion of injected fuel. As noted, in the preferred embodiments the cooling is assisted by injection of water to create a steam cycle wherein the super heated steam combines with the expansion gasses to integrate a Rankine cycle into the modified diesel cycle of the preferred embodiment. While the insulation arrangement can be utilized with four-cycle engines, it is to be recognized that the preferred arrangement is with high pressure, supercharged, two cycle engines. The improved cooling arrangement is used with conventional piston sealing systems or with a preferred high temperature sealing ring system described in Patent Application Ser. No. 027,400 filed Mar. 18, 1987 entitled HIGH PRESSURE RECIPROCATOR COMPONENTS. Sealing may alternately be provided by a labrinth honeycomb seal. The high pressure connecting rod and rolling wrist pin assembly of the referenced HIGH PRESSURE RECIPROCATOR COMPONENTS application is also preferred. These and other improvements will become apparent from a consideration of the detailed description of the preferred embodiments.

BRIEF DESCRIPTION OF THE DRAWINGS

FIG. 2 is an enlarged sectional view of the combustion chamber of FIG. 1 with the pistons at top dead center.

FIG. 3 is an enlarged sectional view of the combustion chamber of FIG. 1 with two pistons at the bottom dead center.

FIG. 4 is a cross sectional view of an engine with a single piston per cylinder with dual connecting rods having double rolling wrist pins.

FIG. 5 is an enlarged partial perspective view of the honeycombed labyrinth seal.

FIG. 6 is a cross sectional view of an engine with a single piston per cylinder with dual connecting rods having double rolling wrist pins provided with an hydraulic gas activated and electronically controlled exhaust system.

DETAILED DESCRIPTION OF THE PREFERRED EMBODIMENTS

Figure 1:
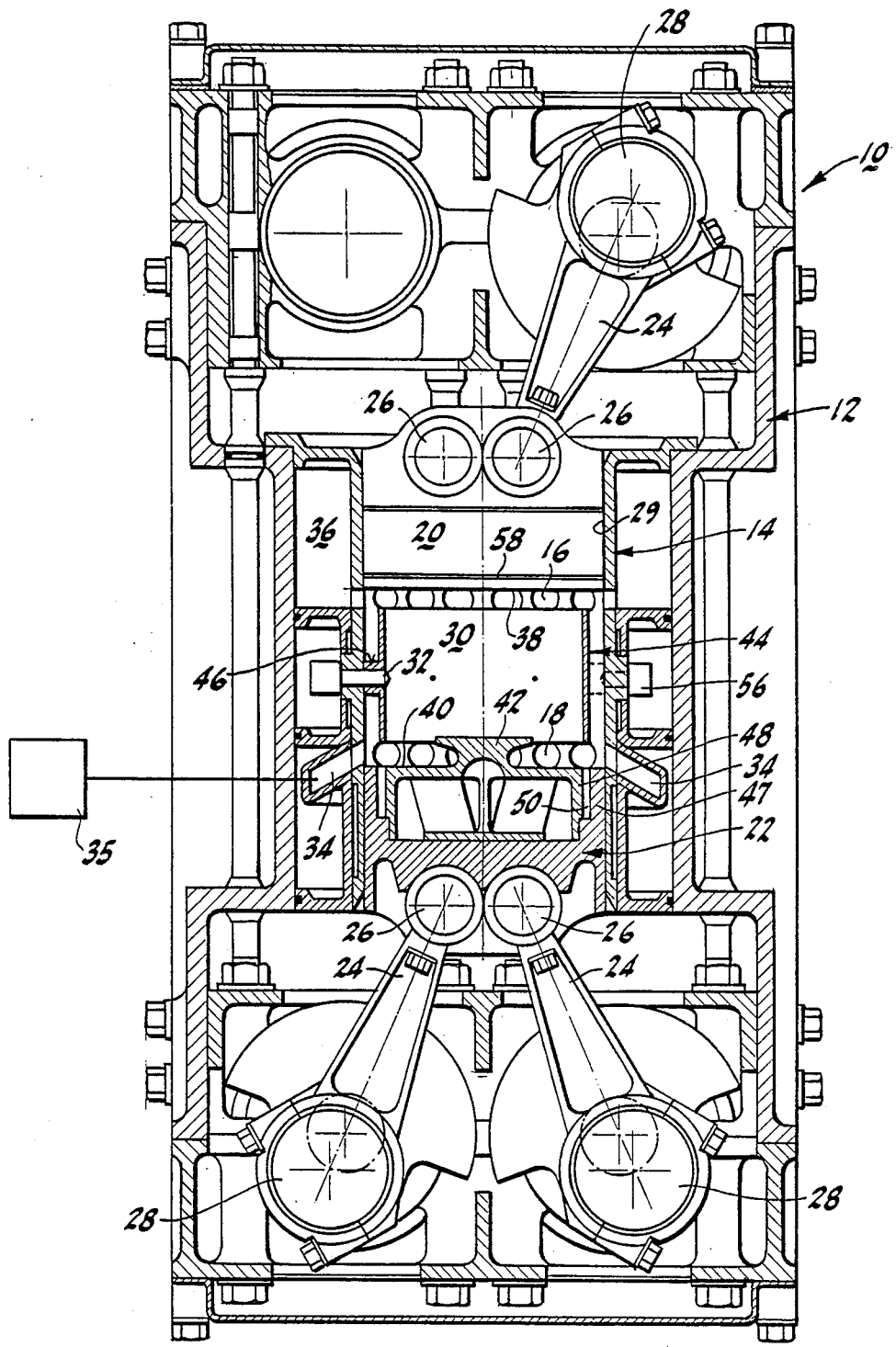
FIG. 1 is a cross sectional view of an engine with two opposed pistons and dual connecting rods with rolling wrist pins.

Referring now to FIGS. 1 to 3, a high pressure high temperature internal combustion engine designated generally by the reference numeral 10 is shown. This engine is designed to be used with a supercharger, preferably a combination positive displacement compressor and positive displacement expander for full utilization of the pressure potential developed by the engine. While turbo super chargers and other types of turbine-style compressers may be used, such may not provide sufficient compression of full utilization for the structural component of this proposed piston engine. Positive displacement rotosuperchargers such as described in the application Regenerative Thermal Engine cited above are preferred.

The engine 10 is constructed with an outer housing 12 containing a internal cylinder 14 having air intake ports 16 and exhaust ports 18. Reciprocal in the cylinder 14 are two opposed pistons 20 and 22, each connected to dual rods 24 having rolling contact wrist pins 26 for cancellation of the opposed side vectors of piston thrust force. The dual rods 24 are connected to separate, oppositely rotating crank shafts 28 to eliminate side thrusts in the cylinder pistons 20 and 22. This rolling wrist pin and dual rod arrangement permits the enormous thrust applied to the piston to be transferred to rotary motion with minimal friction and without breakdown of conventional lubricants.

The opposed pistons 20 and 22 together with the inner walls 29 of the cylinder 14 form a working chamber 30 for compression of air, combustion of fuel injected through a fuel injection nozzle 33 and expansion of combusted gasses. Since it is contemplated that the exhaust gasses are to be delivered to an auxiliary expander component at relatively high pressure, the exhaust ports 18 communicate with an annular manifold 34 connected to an expander component intake (not shown) of an auxilary component 35 shown schematically. Circumferentially arranged around much of the cylinder and encompassing the exhaust manifold 34 is an air intake chamber 36 which collects any vagrant dissipated heat that has escaped the working cylinder for reintroduction into the central combustion chamber through the intake ports 16. The piston heads 38 and 40 are constructed in a substantially identical fashion except that the piston head 40 proximate the exhaust ports 18 includes a central, mushroom-shaped prominance 42 for inducing an annular swirl of injected fuel in addition to piston induced squish for instantaneous ignition when the pistons are positioned as shown in FIG. 2.

Referring now to the working chamber 30 of the engine 10 of FIGS. 1, 2 and 3 the chamber includes a floating liner 44 fabricated of a heat-resistant, porous, refractory or ceramic material. The liner 44 is displaced from the inner cylinder wall 29 and connected thereto by a plurality of spacers 46 centrally positioned and uniformly spaced around the outside of the liner as shown. The liner and spacers are preferably of unitary construction such that the spacers also form the protective casing for one or more fuel injection nozzles 32. Preferably a plurality of fuel injection nozzles are arranged around the central periphery of the cylinder 14 and angularly disposed such that an injected spray of fuel swirls about the combustion chamber formed when the opposed pistons are in the top dead center of the compression cycle as shown in FIG. 2. In this position it can be seen that the pistons are sufficiently displaced that no contact with the spacers results. The piston heads 38 and 40 are formed with an outer sleeve portion 47 and an inner central cylinder portion 48 such that a deep groove 50 is concentrically formed in the surface of the head. This groove 50 is of sufficient width and depth that the suspended liner 44 clears the sleeve portion and central portion of the head leaving an air space 52 on the inside of the liner and an air space 54 on the outside of the liner. These air spaces comprise thermal insulating zones which combine with the liner itself to provide three concentric thermal zones to insulate the high temperature combustion gasses, essentially confined to the working chamber, from the outer walls 29 of the cylinder 14.

As shown in FIGS. 1-3 this thermal insulation is further enhanced by a water injection nozzle 56 which injects a high pressure spray of water into the outer air space 54. The water spray instaneously changes to superheated steam which combines with the combustion gasses and is released through the exhaust ports 18 after expansion of the cylinder gasses. In the embodiment of FIG. 2, high pressure ring seals 58 of the type described in the referenced application HIGH PRESSURE RECIPROCATOR COMPONENTS provide cylinder sealing for the piston 20 proximate the cooler air intake ports, and, a labyrinth groove seal 60 provides a cylinder seal for the piston 22 proximate the hotter exhaust ports 18. It is to be understood that sealing for both of the pistons shown in the embodiment of FIGS. 1 to 3 can be either ring seals such as 58 or honeycomb labyrinth seals 60. The honeycomb labyrinth seals have the advantage of being functional at higher temperatures but have the disadvantage of being less effective at slower operating speeds. The mixed seal arrangement of FIGS. 1 and 2 is primarily for the purpose of disclosing this alternative choice.

Referring now to FIG. 4 a cross sectional view of the combustion chamber area of a two-cycle engine 70 is shown. The engine 70 is designed to be used in association with a compressor or other supercharger 71 for delivering high pressure air to the engine. Preferably, the engine is also associated with an expander 73 to recover the relatively high pressure exhaust gasses from the engine.

The engine 70 includes an outer casing 72 that supports a conventional cylinder lining sleeve 74 and includes a plurality of spaced intake ports 75 through the sleeve and an exhaust exit 76 that communicate with an exhaust passage 78 with outlet 80 that is connected to the expander unit 73. The engine cylinder 82 formed by the cylinder sleeve 74 and part of the outer casing 72 contains a reciprocal piston 84 having dual rolling wrist pins 86 connected to connecting rods 87. The composite piston 84 is constructed with a first metalic inset 86 and a second ceramic inset 88 having a central mushroom-shaped prominance 90, such that fuel injected by one or more angularly and radially disposed fuel injectors 92 generates a combined squish and swirl motion for improved ignition and combustion. While only a single fuel injecter is shown, it is to be understood that a plurality of injectors can be arranged around the periphery of the top of the cylinder and sequentially operated one or more at a time depending upon the operating and load conditions of the engine.

Capping the cylinder 82 is a cylinder head 94 in which the fuel injector 92 is mounted. The cylinder head 94 also receives a central stem valve 96 having a valve head 98 facing the top of the piston projection 90, an arrangement that both protects the valve and adds a substantial squish to the gasses as the piston approaches top dead center.

As in the previously described embodiment a floating liner 100 is suspended from supporting disk 102 that is unitary with the liner and functionally provides an insulation to the head portion of the cylinder. The floating liner 100 is fabricated from a porous refractory material such that air is absorbed within the liner to provide a zone of insulation from the high temperature central portion of the combustion chamber 104.

As described with respect to the previous embodiments of the invention, the piston 84 is constructed such that the piston has an outer perimeter sleeve portion 106 displaced from a concentric inner cylinder portion 108 such that a deep groove 110 is formed into which the suspended cylindrical section of the liner inserts. When inserted as shown in FIG. 4 the cylinder section of the liner 100 forms an inner air jacket zone 110 and an outer air jacket zone 112 which together with the insulating zone of the air filled porous liner 100 provide three insulating layers between the working portion of the combustion chamber and the outer cooler section proximate the walls 114 of the cylinder 82.

After complete compression of the air when the piston is arranged in the cylinder as shown in FIG. 4 fuel is injected by the fuel injector into the annular chamber adding a substantial swirl to the squish action caused in the last stages of compression. The fuel is automatically ignited and expansion begun. At an appropriate point in the engine cycle, water from a water injector 118 is injected into the outer air jacket zone and is immediately vaporized as a superheated steam. This superheated steam expands and mixes with the combustion gasses as the piston is retracted during the power stroke. Just prior to exposure of the intake ports 120 the stem valve 96 is actuated by a hydraulic actuator 122 by operation of electronic servo valves 124 and 126 controlled by a microprocesssor 128. The combustion gasses still under pressure are exhausted through exhaust passage 130 and preferably delivered to the expansion side of a positive displacement, compound rotosupercharger 132 as described in the reference patent, entitled Regenerative Thermal Engine. The compound rotosupercharger 132 has a compression side which delivers highly compressed air to the intake ports for passage to the working chamber upon exposure of the intake ports when the piston reaches the end of its expansion stroke. The fuel injection and the water injection are similarly controlled by the microprocessor 128 and may be varied in timed sequence according to an optimization schedule that is dependent upon engine operating speed and load conditions.

The combustion chamber formed at the time of initial combustion is relatively contained by the refractory materials such as the piston inset 108, the disk portion 102 of the liner 100 and the valve seat 140 for the stem valve 96. The valve head 98 as mentioned is protected largely by the proximately situated projection 90 of the inset 86. The piston is sealed by high pressure sealing rings 142 inserted in the top of the outer sleeve portion of the piston and conventional outer rings 144 inserted in the cool cylinder wall below the combustion chamber.

Alternately, the reciprocal piston may be sealed with respect to the cylinder wall by a honeycomb liner shown in phantom on the left portion of the cylinder lining sleeve 74 and illustrated in greater detail in the fragmentary enlarged view of FIG. 5. The honeycomb, labyrinth inset 60 shown in FIG. 5, which is common to all of the alternate embodiment configurations consists of a honeycomb wall structure 150 that forms a plurality of recesses 152 into which compressed air enters during the compression stroke and regeneratively is released into the combustion gasses as the piston is retracted on the expansion stroke. The motion of the piston across the open face of the honeycomb cells creates a turbulence that impedes gas bypass, particularly at higher operating speeds of the engine. It is to be noted that the dual, connecting rod configuration of the pistons prevents side thrust and enables the piston to maintain its clearance from the cylinder walls.

Referring now to the embodiment of FIG. 6 an arrangement similar to that shown in FIG. 4 is illustrated in which a single cylinder arrangement of an engine 150 has a reciprocal piston 152 reciprocates in a cylinder 154. The piston 152 is connected by dual, rolling-wrist pins 156 which connect the piston to double connecting rods 158 for connection to a dual oppositely rotated crank arrangement (not shown) as previously described with reference to FIG. 1. The cylinder 154 is formed in part by an outer casing 160 that includes a lining sleeve 162 and is capped by a head structure 164. The engine 150 is designed for two-cycle operation and includes compressed air intake ports 166 through the lining sleeve 162 and wall 168 of the casing 160 in a manner similar to that described with reference to FIG. 4.

The head structure 164 includes a hydraulically operated valve ring similar to those disclosed in the application entitled INTERNAL COMBUSTION ENGINE WITH ADJUSTABLE FLOW EXHAUST SYSTEM Ser. No. 051,494, filed May 18, 1987 incorporated by reference herein. In the embodiment of FIG. 6, the head structure 164 is constructed with a ring valve 170 which blocks a substantially annular exhaust manifold 172 having an outlet port 174 leading to an energy recovery system 175 such as the rotosupercharger described with reference to FIG. 4. The ring valve 170 is in an annular guide 174 in the head structure 164. The annular ring valve 170 has an enlarged end 176 that seats in a hydraulic chamber 178, limiting maximum extension of ring valve 170 into the combustion chamber 180 of the engine. Low temperature seals 182 in the wall of the guide 174 together with high temperature overlapping sealing rings 184 and 185 seal the combustion chamber 180 from the exhaust chamber 172 and the hydraulic chamber 178. The ring valve 170 is preferably of a ceramic coated or refractory material to withstand the high temperatures of the combustion chamber 180.

A centrally located fuel injector 186 is also mounted in the head structure 164 for delivering a spray into the combustion chamber at an appropriate time in the cycle of operation of the engine. The hydraulic chamber 178 communicates with a high pressure hydraulic supply 188 which in this embodiment supplies hydraulic fluid, which is also the engine fuel, to the hydraulic chamber 178 and to the fuel injector 186. Preferably the fluid circuit is such that the fluid is first supplied to the hydraulic chamber, heated and then supplied to the fuel injector such that an heat losses through the head structure are recovered and returned to the combustion chamber. Under control of a microprocessor 190 the hydraulic supply valve system 192 to the hydraulic chambers is regulated such that the ring valve 170 blocks the exhaust chamber 172 until an optimum time. At a select time a return valve is opened allowing return of the hydraulic fluid, wherein the pressure in the cylinder acts on the portion of the ring valve that projects into the combustion chamber forcing the ring valve into a retracted position exposing the exhaust chamber and exhaust port. If desired, retraction of the ring valve can be limited to impede exahust flow under low load and low speed conditions.

The piston 152 is constructed with a piston head 194 having a central conical-like projection 196 to form a substantially annular configuration to the combustion chamber 180 at the moment the piston is in its top position for injection and combustion of injected fuel. The central cylinder head portion 198 is displaced from an outer sleeve portion 200 such that a deep groove 202 is formed. As in previous embodiments, the depending cylindrical section 203 of the floating liner 204 enters the groove 202 in the piston head 194 dividing the groove into an inner air jacket zone 206 and an outer air jacket zone 208, which combine with the air impregnated liner zone 210, to form a three layer thermal insulation between the working chamber 180 of the cylinder 154 and the lining sleeve 162 of the cylinder 154. Again the liner 204 is fabricated of a porous refractory material and includes a unitary thick base 212 which can provide an insulation for mounting of a water injector 216 and for an insulation for the exhaust chamber 172.

As previously described water is injected through the water injector and fuel is injected through the fuel injector at optimum times regulated by a microprocessor 218 which also controls the optimum timing of the release of the ring valve 170. Air intake is provided through intake ports 166 from an associated compound turbo charger as previously described. Again, the piston 152 is alternately sealed by high pressure piston rings 222 and conventional low pressure sealing rings 224 or alternately by a honeycomb labyrinth sealing structure 60 in the wall of the lining sleeve 162 of the cylinder liner a shown in phantom and described in greater detail with reference to FIGS. 4 and 5.

In summary, the unique floating liner in conjunction with the unique construction of the engine piston forms a three-zone insulating system that combines with other heat-recovery systems described with respect to the various embodiments presented to form a highly efficient adiabatic engine that can operate at the extraordinarily high temperatures and pressures of optimum fuel combustion with minimal dissipation of thermal energy and maximum recovery of the thermal potential as useful work. The special configuration of the floating liner protects the outer sleeve portion of the piston and the inner wall of the cylinder which is continuously in contact only by the air and/or steam and is never in contact with the hot combustion gasses. In addition to eliminating totally the necessary cooling of the hot zones by an auxiliary cooling system all thermal energy that escapes the combustion chamber and penetrates the air zones is recovered during the expansion process of the combustion gasses. Residual cooling is restricted only to super charged air inter coolers and oil coolers, which cooling may be done by water and/or fuel for the first step in preheating before circulating to the variously described heat-recovery systems that operate in conjunction with the unique floating liner system for total supression of the infrared signature of the internal combustion operation. In those systems incorporating water injection for cogeneration in a single unit water may be recovered and filtered from the exhaust on cooling the exhaust when eliminating infrared signature. In stationary systems where water recovery and thermal signature are not of great importance, water may be supplied directly from a water supply source.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An internal combustion engine with a heat recovery system comprising: a cylinder with a cylinder wall; a piston with a piston head, the piston being reciprocally displaceable in the cylinder; a fuel injection means with fuel connected to the cylinder; and, an air intake passage and an exhaust passage connected to the cylinder, such that air is delivered to the cylinder, compressed by the piston, and fuel from the fuel injection means is delivered to the cylinder and combusted in a working chamber; wherein the heat recovery system includes an air-porous, heat-resistant, tubular liner suspended in the cylinder and displaced from the wall of the cylinder, the piston having a deep groove with inner and outer walls in the head of the piston into which the liner is received when the piston is displaced compressing the air, said liner being spaced from the inner and outer walls of the groove such that three insulating zones are provided between combustion gases in the cylinder and the cylinder wall during displacement of the piston.

2. The internal combustion engine of claim 1 wherein the cylinder includes a second piston with a piston head facing the first piston, the piston being reciprocally displaceable in the cylinder in an opposed fashion with the first piston wherein the second piston has a deep groove with inner and outer walls in the piston head into which the liner is received when the second piston is displaced compressing the air, and wherein the tubular liner is suspended by means midway on the liner in the center of the cylinder wherein the liner has opposite ends engageable by the groove of the opposed pistons.

3. The internal combustion engine of claim 2 wherein the opposed pistons are connected to double connecting rods by dual, rolling wrist pins, and the connecting rods are connected to oppositely rotating cranks for high pressure operation in combination with a supercharger.

4. The internal combustion engine of claim 2 wherein at least one electronic fuel injector is positioned midway between the opposed piston heads for injecting fuel into the working chamber at the center of the cylinder.

5. The internal combustion engine of claim 2 wherein at least one water injector is positioned midway between the opposed piston heads for injecting water between the cylinder wall and the liner.

6. The internal combustion engine of claim 2 wherein the cylinder wall is encompassed by an air chamber for preheating compressed air from waste heat before the air is introduced into the combustion chamber.

7. The internal combustion engine of claim 2 including honeycomb labyrinth seals in the cylinder wall for sealing the reciprocating pistons.

8. The internal combustion engine of claim 2 wherein the pistons have high temperature, high pressure sealing rings.

9. The internal combustion engine of claim 2 wherein one piston head includes a mushroom shaped prominence for inducing a swirling action to injected fuel.

10. The internal combustion engine of claim 1 wherein the exhaust passage has an electronically controlled stem valve for timed exhaust of combustion gases from the cylinder.

11. The internal combustion engine of claim 10 wherein the piston is connected to double connecting rods by dual, rolling wrist pins for high pressure operation in combination with a supercharger.

12. The internal combustion engine of claim 10 wherein the fuel injection means includes an electronic fuel injector injecting fuel into the working chamber.

13. The internal combustion engine of claim 10 having at least one water injector for injecting water between the liner and cylinder wall.

14. The internal combustion engine of claim 10 including a honeycomb labyrinth seal in the cylinder wall for sealing the reciprocating pistons.

15. The internal combustion engine of claim 10 wherein the pistons have high temperature, high pressure sealing rings.

16. The internal combustion engine of claim 1 wherein the cylinder has an intake end and an exhaust end, wherein the air intake passage includes a plurality of spaced ports at the intake end exposed by the piston when in a retracted position, and wherein the air exhaust passage includes an annular slide valve at the exhaust end.

17. The internal combustion engine of claim 16 wherein the annular slide valve has an electronically controlled hydraulic actuator for blocking all or a part of the exhaust passage.

18. The internal combustion engine of claim 16 wherein the piston is connected to double connecting rods by dual, rolling wrist pins for high pressure operation in combination with a supercharger.

19. The internal combustion engine of claim 16 wherein the fuel injection means includes a centrally positioned fuel injector injecting fuel into the working chamber.

20. The internal combustion engine of claim 16 including a water injector means for injecting water between the liner and the cylinder wall.

21. The internal combustion engine of claim 16 including a honeycomb labyrinth seal in the cylinder wall for sealing the reciprocating piston.

22. The internal combustion engine of claim 16 wherein the pistons have high pressure sealing rings.

* * * * *